Jan. 2, 1968  P. ALEXANDRE  3,361,154
SELF-CENTERING VALVE FOR CONTROLLING LIQUID PRESSURES
Filed July 21, 1965

INVENTOR
PHILIPPE ALEXANDRE

BY  *John J. Hart*
ATTORNEY

United States Patent Office 3,361,154
Patented Jan. 2, 1968

3,361,154
SELF-CENTERING VALVE FOR CONTROLLING LIQUID PRESSURES
Philippe Alexandre, La Tronche, France, assignor to Ateliers Neyret-Beylier & Piccard-Pictet (Neyrpic), Grenoble, France, a corporation of France
Filed July 21, 1965, Ser. No. 473,869
Claims priority, application France, July 27, 1964, 4,714
8 Claims. (Cl. 137—315)

ABSTRACT OF THE DISCLOSURE

A pressure regulating valve having intermediate the shutter plate of the nozzle and the spring for biasing the plate to closed position, a force transmitting plate which normally transmits the force of the spring to the shutter plate, but which can transfer such spring force to a support element located exteriorly of the nozzle without changing the location of the spring on the valve or effecting its setting when the nozzle and shutter plate are dismantled from the valve.

---

This invention relates to improvements in pressure regulating valves of the type which include an obturator plate cooperating with the outlet end of a liquid nozzle and biased toward its closed position on such nozzle by a coil spring.

As is shown in U.S. Letters Patent 2,694,411 issued Nov. 16, 1954, valves of the indicated type comprise a circular obturator having a diameter greater than the nozzle opening and being directly engaged by one end of a coil spring which is retained attached to and in compression against the obturator by a retaining plate engaged with the other end of the spring. In order that the valve shall operate properly, it is necessary that the coil spring be adjusted to enable the obturator to function with the required self-centering action. Heretofore the parts have been mounted on the nozzle so that the obturator and nozzle cannot be dismantled for reconditioning or repair without destroying such setting and necessitating the resetting of the valve spring on the reassembly of the parts.

The essential purpose of the present invention is to provide an improved construction which shall enable one to conveniently dismantle and reassemble the obturator and nozzle without upsetting the setting of the valve operating spring.

In accordance with the invention, the valve spring exerts its thrust on the obturator through a special component constructed to enable the thrust of the spring to be transferred from the obturator to a collar temporarily fitted around the nozzle so that the nozzle and the obturator can be dismantled from underneath the valve spring and through the central opening of a flange supporting the nozzle and obturator, without dismantling the spring and consequently, without interfering with its setting.

Figure 1:
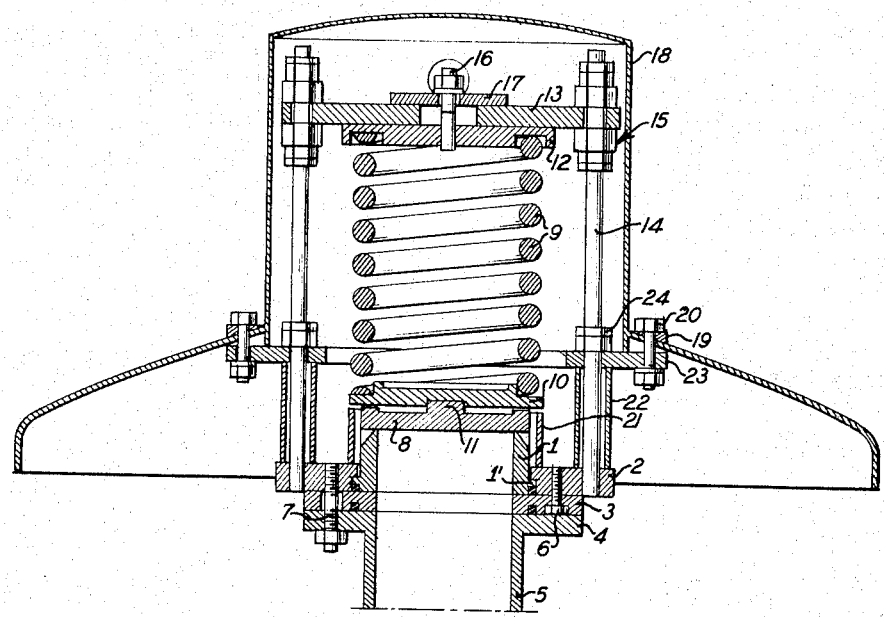
Figure 2:
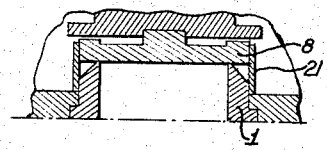

The features and advantages of the invention will become more readily apparent from a perusal of the following description when read in connection with the accompanying drawings which illustrate an example of a practical form of the invention and in which FIG. 1 is a sectional elevational view of a valve constructed in accordance with the invention and showing the transfer collar in loosened condition in the valve; and FIG. 2 is a partial view of FIG. 1 showing the collar in tightened condition.

In the drawings, the reference numeral 1 indicates a nozzle, the discharge end of which is provided with a rim forming a valve seat for the valve shutter plate or obturator 8; the nozzle and plate thus forming the seating components of the valve. The entry end of nozzle 1 is provided with an outwardly extending flange 1' seated in a recess provided in the inner periphery of a nozzle support constituted of an annular member 2. The flange 1' is retained in such recess by an annular locking ring 3 mounted on the flange 4 at the upper end of a pipe 5 to which the valve is fitted. The ring 3 is secured to the annular member 2 by recessed cheese head screws 6 and the assembly composed of the ring 3, member 2 and nozzle 1 is secured to the pipe flange 4 by studs 7.

The valve shutter plate 8 is held against the rim of nozzle 1 by the valve operating spring 9 through a dished pressure plate 10 which transmits the thrust of the spring to a boss 11 provided at the center of the shutter plate. The boss 11 snugly fits into a corresponding recess in the dished pressure plate 10 and is of sufficient height to support plate 10 with its bottom surface slightly spaced from the shutter plate 8. The upper portion of the periphery of plate 10 is provided with an annular recess in which is seated the last coil on the lower end of spring 9. The pressure plate 10 thus protects the lower end of the operating spring against unavoidable deformation by the valve shutter plate 8 in the use of the valve.

The operating spring 9 is maintained in a position by a retaining plate 12 having an annular groove provided in the face thereof which is disposed in opposed relation to the recessed side of plate 10 and in which groove is seated the uppermost coil of the spring. The retaining plate 12 bears against the underside of a disk member 13 adjustably secured to six threaded rods 14 by sets 15 of nuts and beveled washers. The retaining plate 12 is adjustably secured to the disk members 13 by a retaining or anchoring plate 17 and a stud 16 extending through the central opening of disk 13 and threadedly connected to plate 12. The central opening in the disk member 13 is large enough to permit of a given amount of lateral movement of retaining plate 12 relative to the disk member 13. As a result of the aforesaid construction, the retaining plate 12 is enabled to be adjusted to the required height and angle and to be centered with respect to the vertical axis of the valve to obtain the proper self-centering action necessary in the operation of the valve. Thus, it is possible when adjusting the valve for a particular installation to ensure that the spring action against the valve shutter plate 8 will remain perfectly perpendicular to the plane of the rim of nozzle 1 and directed along its geometrical axis in order not to upset the self-centering tendency and to insure that both the stresses are distributed as evenly as the water pressures and the shutter plate in lifting off the valve seat remains parallel to itself.

The rods 14 are threadedly secured at their lower ends to the annular member 2 secured to the pipe flange 4. Encircling the lower ends of rods 14 and supported by the annular member 2 are spacers 22 on which are seated an annular member 23 provided with openings through which the rods extend. The annular member 23 is secured in position on the spacers 22 by nuts 24. Mounted on the annular member 23 and connected thereto by a ring 19 and bolts 20 is a hood 18 which houses the valve and guides the discharge of water emitted from the nozzle 1.

Encircling the rimmed end of nozzle 1 and the valve shutter plate 8 is a collar 21 which may be made in two or more parts suitably connected together in a known manner to enable the collar to be readily positioned around such valve elements or removed therefrom, and to be positioned therearound in non-gripping or loose condition, as shown in FIG. 1 or in the form of a clamp enabling it to be tightly secured to such valve elements as shown in FIG. 2 of the drawings. The collar 21 is mounted on the annular member 2 so as to be located between the inner peripheral edge portion of such member and the outer peripheral edge portion of the pressure plate 10 projecting beyond the periphery of the shutter plate 8. The height of the collar is such as to leave a slight clearance between its top edge and the pressure plate 10 in the assembled condition of the nozzle 1 and the shutter plate 10 with the latter seated on the rim of nozzle 1 as shown in FIG. 1.

It will be understood from the foregoing that when it is desired to dismantle the valve seating components, i.e., the nozzle 1 forming the valve seat and the valve shutter plate 8, the valve as a whole should be first disconnected from pipe flange 4 by removing the nuts from studs 7 and lifting the valve as a unit from pipe 5. The hood 18 is then removed by disconnecting the bolts 20 from the annular member 23 to fully expose the elements of the valve itself. The collar 21 is then positioned around the nozzle 1 and shutter plate 8, being left slack for the time being as shown in FIG. 1 The screws 6 are then removed to permit the removal of the lock ring 3 thereby unlocking the nozzle 1. The nozzle 1 and the shutter plate 8 may now be withdrawn downwardly through the loose collar 21 and the central opening in the annular member 2. As the shutter plate 8 is withdrawn, the pressure plate 10 will be urged downwardly by the spring 9 and come to bear against the top of the collar 21. The collar 21 will hold the spring in its assembled adjusted position until the nozzle 1 and shutter plate 8 are again assembled in the valve.

The nozzle 1 and shutter plate 8 are reassembled after working surface reconditioning or component replacement operations by assembling such valve elements in the reverse order to that in which they have been removed. Thus the shutter plate 8 is first inserted into the central opening of the annular member 2 and then the nozzle 1. The lock ring 3 is then forced into position against the underside of the annular member 2 and secured in such position by the screws 6. As the nozzle 1 is forced into locked position the shutter plate 8 will lift the pressure plate 10 from the collar 21 thereby freeing the latter and enabling it to be removed. After the removal of the temporary collar 21, the valve hood 18 is refitted, and the valve assembly again secured to the flange 4 at the end of the pipe 5.

It will thus be seen that the construction of the invention enables the ready and rapid dismantling of seating components from the valve without disturbing the position of the operating spring, thereby enabling the valve to be again placed in operative condition without the necessity of resitting the operating spring. Should it be desired to secure the valve for transport instead of assembling it on the pipe 5, the collar 21 is not removed, but is instead tightened around the shutter plate 8 and nozzle 1, as shown in FIG. 2 of the drawings.

While I have hereinabove described and illustrated in the drawings one practical example of my invention, it will be apparent to those skilled in the art that various other modifictions thereof may be made without departing from the spirit of the invention. Hence it is intended to cover all modifications of the invention coming within the scope of the appended claims.

I claim:

1. A liquid pressure control device comprising a support having an opening therethrough, a nozzle extending through such opening and mounted on said support, a shutter plate mounted on the discharge end of said nozzle, said nozzle and shutter plate being dismantlable from underneath said support through said opening in said support, a spring retainer spaced from and in alignment with said nozzle, a coil spring retained in compression between said shutter plate and said spring retainer and biasing said shutter plate to closed position on said nozzle, and means at the lower end of said spring constructed and arranged to normally transmit the force of said spring to said shutter plate, and operable to transfer the force of said spring from said shutter plate to an element mounted on said support exteriorly of said nozzle without changing the location of said spring in the device or substantially effecting its setting when said nozzle and shutter plate are dismantled from said support.

2. A device as defined in claim 1, in which said shutter plate is circular and has a diameter less than the diameter of said support opening, said force transmitting means constituting a force transmitting plate overlying said shutter plate and having a diameter greater than that of the latter so that the peripheral edge portion of said force transmitting plate projects beyond the periphery of said shutter plate and the exterior of said nozzle, whereby said force transmitting plate normally presses down on said shutter plate under the force of said spring and is enabled to transfer the force of the spring through said projecting peripheral edge portion thereof to an element mounted on said support exteriorly of said nozzle when said shutter plate is dismantled.

3. A device as claimed in claim 1, in which said support comprises an annular member surroundng said nozzle, and including an element constituting stop means mounted on said annular member exteriorly of said nozzle and spaced from said force transmitting means in the assembled condition of said nozzle and shutter plate, and engageable by said force transmitting means when said nozzle and shutter plate are dismantled.

4. A device as claimed in claim 3, in which said element is circular and surrounds said nozzle and shutter plate.

5. A device as claimed in claim 4, in which said circular element is a clamp operable to clamp said nozzle and shutter plate together.

6. A device as claimed in claim 2 in which one of said shutter and force transmitting plates is provided with a central projection extending into engagement with the other plate, and such other plate is provided with a recess receiving the end of said projection, the force of said spring being transmitted to said shutter plate through said projection.

7. A device as claimed in claim 1, including a transverse member having a central opening, frame members adjustably connecting said transverse member to said support at a given distance from said nozzle with said central opening thereof in alignment with the nozzle, and means extending through the central opening in said transverse member and securing said spring retainer to said transverse member, said securing means being operable to secure said spring retainer to said transverse member in a transversely adjusted position relative to said nozzle.

8. A device as claimed in claim 1, including a framework connecting said spring retainer to said support at a given distance from said nozzle, a hood forming a housing for the device, and means connecting said hood to said framework between said support and said spring retainer.

References Cited

UNITED STATES PATENTS

| | | | |
|---|---|---|---|
| 585,132 | 6/1897 | Stromvall | 137—329.2 |
| 1,805,342 | 5/1931 | Otto | 251—337 |
| 2,694,411 | 11/1954 | Ponsar | 137—543.17 |

WILLIAM F. O'DEA, *Primary Examiner.*

D. R. MATTHEWS, *Assistant Examiner.*